H. S. PIERCE.
MEANS FOR TAKING UP DRIVE CHAINS.
APPLICATION FILED FEB. 17, 1916.

1,193,419.

Patented Aug. 1, 1916.
2 SHEETS—SHEET 1.

Inventor:
Harold S. Pierce
by his Attorneys
Howard Howson

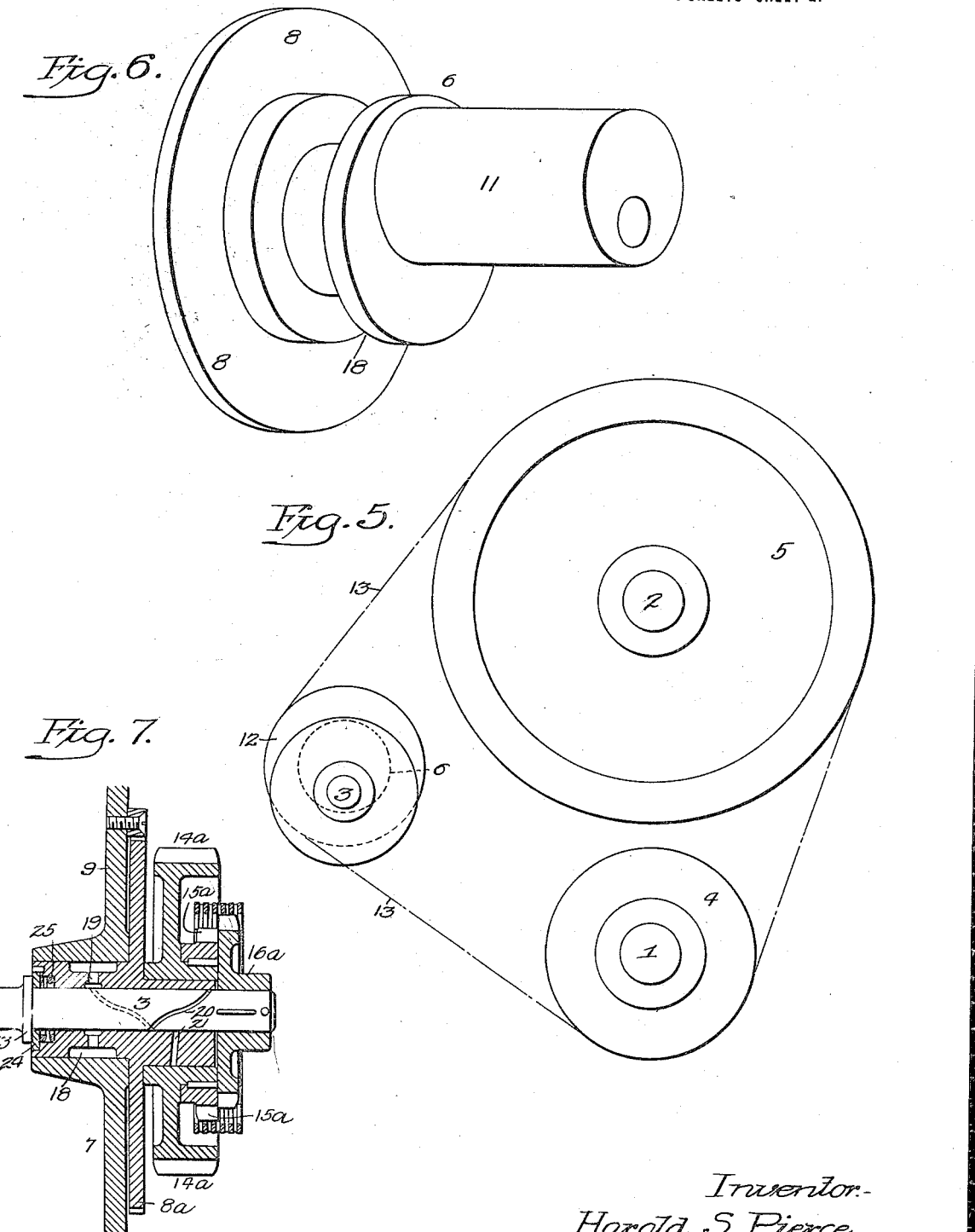

UNITED STATES PATENT OFFICE.

HAROLD S. PIERCE, OF PHILADELPHIA, PENNSYLVANIA, ASSIGNOR TO LINK-BELT COMPANY, OF CHICAGO, ILLINOIS, A CORPORATION OF ILLINOIS.

MEANS FOR TAKING UP DRIVE-CHAINS.

1,193,419.

Specification of Letters Patent.

Patented Aug. 1, 1916.

Application filed February 17, 1916. Serial No. 78,925.

*To all whom it may concern:*

Be it known that I, HAROLD S. PIERCE, a citizen of the United States, residing in Philadelphia, Pennsylvania, have invented certain Improvements in Means for Taking up Drive-Chains, of which the following is a specification.

My invention relates to certain improvements in means for taking up the slack in drive chains, caused by the constant wearing of the parts of the chain.

The invention is particularly adapted for use in connection with the chain used in driving the several shafts of an automobile from the crank shaft.

The object of my invention is to provide means for taking up the slack without disturbing the relative arrangement of the severals shafts driven by the chain.

The invention also relates to certain improvements in the means for connecting the driving sprocket wheel with the driven shaft.

The invention further relates to details of construction which will be fully described hereinafter, reference being had to the accompanying drawings, in which:—

Figure 1:
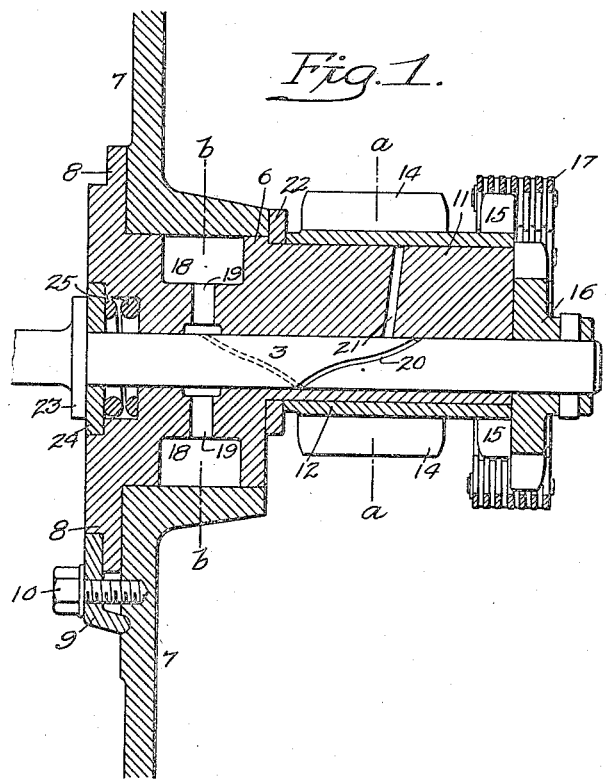
Figure 2:
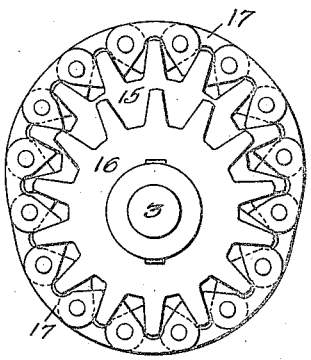
Figure 3:
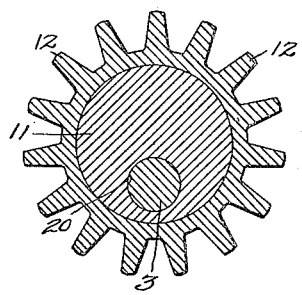
Figure 4:
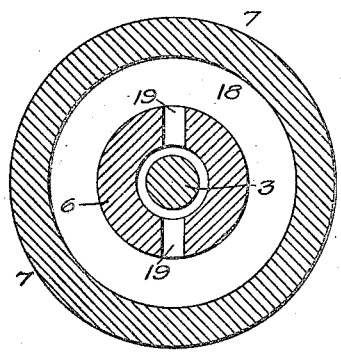

Figure 1, is a longitudinal sectional view illustrating my improved means for taking up the slack of drive chains; Fig. 2, is an end view; Fig. 3, is a transverse sectional view on the line $a$—$a$, Fig. 1; Fig. 4, is a transverse sectional view on the line $b$—$b$, Fig. 1; Fig. 5, is a diagram illustrating the position of the several shafts connected by a drive chain; Fig. 6, is a detached perspective view of the bearing; and Fig. 7, is a view of a modification.

In the present instance, 1 is the crank shaft of an automobile.

2 is the cam shaft and 3 is the pump or magneto shaft.

On the crank shaft is a sprocket wheel 4 and on the cam shaft is a sprocket wheel 5. The pump shaft 3 is mounted in a bearing 6 adapted to a recess in the frame 7 of the machine, and at the rear of this bearing is a flange 8, which is clamped to the frame by a clip 9 and bolt 10, but other means of fastening the bearing to the frame may be resorted to without departing from the essential features of the invention.

The bearing 6 has a projecting eccentric portion 11 on which is mounted the sprocket wheel 12. A chain 13 passes around the wheel 12 and also around the sprocket wheels 4 and 5. The chain 13 is adapted to the teeth 14 of the sprocket wheel 12. On the end of the sprocket wheel 12 is a series of teeth 15 forming a smaller sprocket wheel, and secured to the end of the shaft 3 is a sprocket wheel 16. A chain 17 of a width to engage the teeth of both sprocket wheels 15 and 16 is mounted as shown in Figs. 1 and 2, and the motion of the sprocket wheel 12 is transmitted through the chain 17 to the sprocket wheel 16 and the shaft 3. By this construction, no matter into what position the bearing is turned to take up the slack of the chain 13, the shaft 3 will be driven, as the chain 17 engages the teeth of the wheel 15 at one side and the teeth of the wheel 16 at the opposite side, as clearly illustrated in the drawings.

I preferably form an annular groove 18 in the bearing 6 and use this groove as a receptacle for lubricant and connect it by small passages 19 with the opening through which the shaft 3 extends. The shaft may have spiral grooves, as shown at 20, and these grooves preferably connect with the surface of the eccentric 11 through a passage 21.

Located on the eccentric portion of the bearing between the frame and the sprocket wheel is a washer 22. On the inner end of the shaft 3 is a collar 23 bearing against a washer 24 located in a recess in the rear end of the bearing and in this recess is a coiled spring 25, which tends to hold the shaft and its sprocket wheel against the bearing, thus preventing rattling.

In setting the several elements of the drive, the bearing 6 is so adjusted with respect to the shafts 1 and 2, that when the bearing is turned in one direction it will take up the slack of the drive chain, and as the chain wears this will be taken up until the eccentric has reached its full height. When in this position, the chain is either worn away or will need removal of a link, after which the bearing can be re-set.

By this construction, it will be seen that while the chain can be taken up as it wears, the relation of the several shafts in respect to each other and to the engine is not altered, so that all of the shafts can be located in fixed bearings.

In Fig. 7, I have illustrated a modification in which the small sprocket wheel 15ᵃ is located within the sprocket wheel 14ª and the flange 8ª is located in the opposite side of the frame to that shown in Fig. 1.

I claim:—

1. The combination in means for taking up the slack of drive chains, of a frame; a bearing mounted therein; a shaft located in the bearing and concentric with the opening in the frame, said bearing having an eccentric portion; a sprocket wheel on the eccentric portion having main driving teeth and having transmitting teeth; a toothed sprocket wheel secured to the shaft and having teeth of the same pitch as the transmitting teeth of the first mentioned wheel; a drive chain adapted to drive the first-mentioned sprocket wheel; and a transmitting chain extending over the transmitting teeth of the said first-mentioned sprocket wheel and over the teeth of the wheel secured to the shaft.

2. The combination in means for taking up the slack of drive chains, of a frame; a bearing mounted therein; a shaft located in the bearing and concentric with the opening in the frame, said bearing having an eccentric portion; a sprocket wheel on the eccentric portion having main driving teeth and having transmitting teeth; a toothed sprocket wheel secured to the shaft; a drive chain adapted to drive the first-mentioned sprocket wheel; and a transmitting chain extending over the transmitting teeth of the said first-mentioned sprocket wheel and over the teeth of the wheel secured to the shaft.

3. The combination in means for taking up the slack of drive chains, of a frame; a bearing mounted therein; a shaft located in the bearing and concentric with the opening in the frame, said bearing having an eccentric portion; a sprocket wheel on the eccentric portion having main driving teeth; and a transmitting chain connecting the shaft with the sprocket wheel, whereby motion of the sprocket wheel will be transmitted to the shaft.

HAROLD S. PIERCE.